United States Patent
Fidler et al.

(10) Patent No.: US 12,518,745 B1
(45) Date of Patent: Jan. 6, 2026

(54) NATURAL LANGUAGE PROCESSING

(71) Applicant: Amazon Technologies, Inc., Seattle, WA (US)

(72) Inventors: Eli Joshua Fidler, Toronto (CA); Shiv Naga Prasad Vitaladevuni, Belmont, MA (US); Reza Solgi, Belmont, MA (US); Dhruv Jain, Toronto (CA); Nawdesh Uppal, Mississauga (CA)

(73) Assignee: Amazon Technologies, Inc., Seattle, WA (US)

( * ) Notice: Subject to any disclaimer, the term of this patent is extended or adjusted under 35 U.S.C. 154(b) by 598 days.

(21) Appl. No.: 17/853,484

(22) Filed: Jun. 29, 2022

(51) Int. Cl.
*G10L 15/18* (2013.01)
*G10L 15/30* (2013.01)

(52) U.S. Cl.
CPC .......... *G10L 15/1815* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 2015/0186156 A1* | 7/2015 | Brown | ................... | H04L 51/02 |
| | | | | 715/706 |
| 2022/0374605 A1* | 11/2022 | Sethi | ................... | G06T 19/006 |

* cited by examiner

*Primary Examiner* — Nicole A K Schmieder
(74) *Attorney, Agent, or Firm* — Pierce Atwood LLP

(57) ABSTRACT

The present disclosure provide techniques for processing natural language inputs on a user device or a system. In some embodiments, a device includes a component configured to predict an output(s) responsive to a user input, where the component learns the output based on historic processing performed by a more robust natural language processing system. The component processes ASR and NLU data to determine: (1) a natural language output that is presented as an audio or a visual output, (2) an action to be performed by a skill, and/or (3) a skill to respond to the user input. The component is automatically updated for new intents, features, business logic, etc., based on learning from the natural language processing system.

16 Claims, 7 Drawing Sheets

NATURAL LANGUAGE PROCESSING

BACKGROUND

Natural language processing systems have progressed to the point where humans can interact with computing devices using spoken and typed natural language inputs. Such systems employ techniques to identify the words spoken or written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
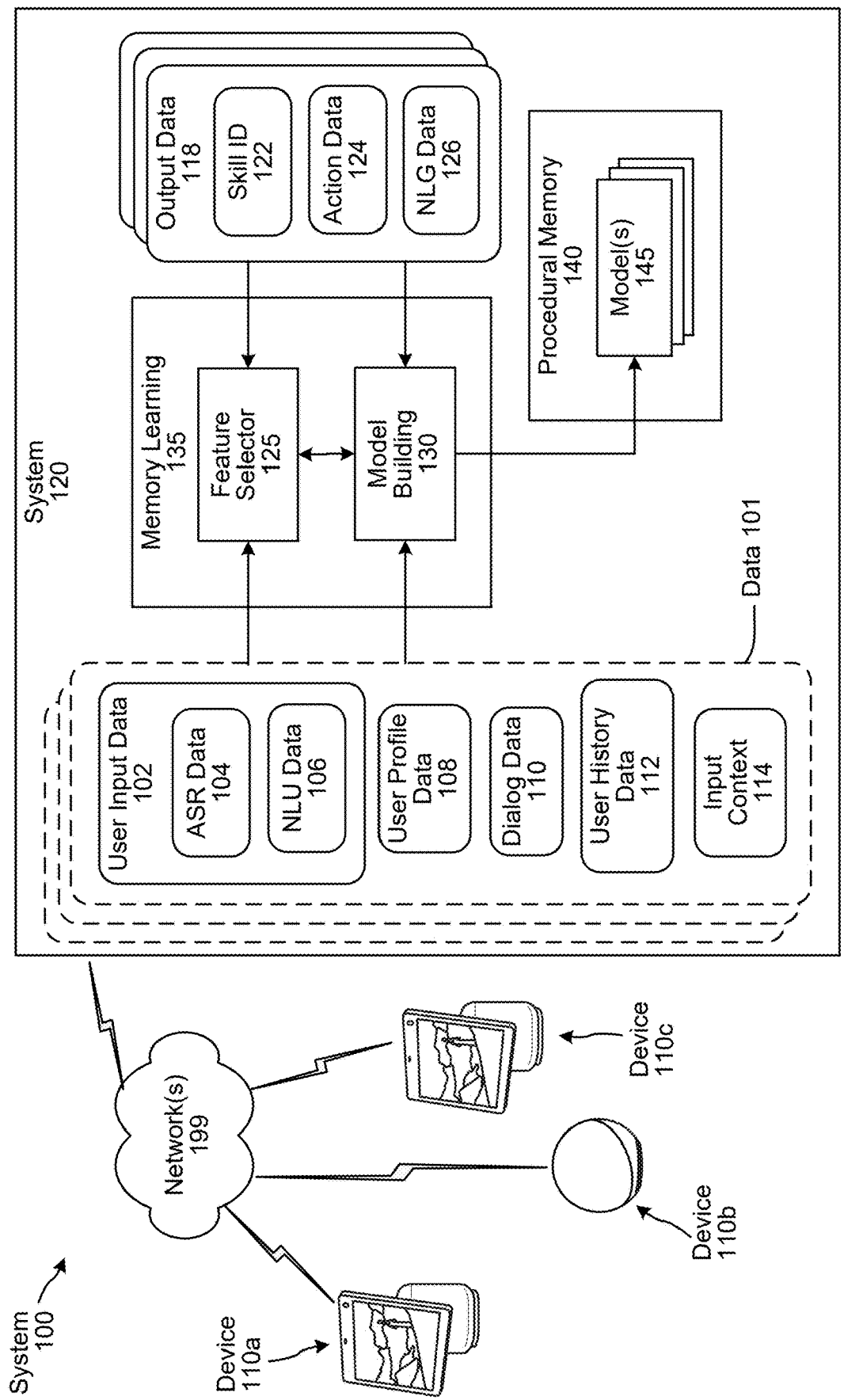
FIG. 1 is a conceptual diagram illustrating an example system for configuring a procedural memory component to determine outputs responsive to natural language inputs, according to embodiments of the present disclosure.

Automatic speech recognition (ASR) is a field of technology using computer science, artificial intelligence, and linguistics concerned with transforming audio data associated with speech into text representative of that speech. Similarly, natural language understanding (NLU) is a field of technology using computer science, artificial intelligence, and linguistics concerned with enabling computers to derive meaning from text input containing natural language. ASR and NLU are often used together as part of a speech processing system. Spoken language understanding (SLU) involves determining meaning (e.g., intent, entities, etc.) directly from audio including speech. Text-to-speech (TTS) is a field of technology concerning transforming textual data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Certain natural language processing systems may be configured to perform actions responsive to user or other audio inputs. For example, for the user input of "Alexa, play music by [artist]," a system may output music sung by the indicated artist. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

Some systems can include multiple different components to process a natural language input and to determine an appropriate response. Output of the response can involve output of audio (e.g., synthesized speech, music, etc.), output of video (e.g., movie, etc.), display of visual information (e.g., weather information, production information, etc.), performance of an action (e.g., turning on lights, adjusting a thermostat, setting a timer, etc.), and the like. The system can include an ASR component, an NLU component, an SLU component, and/or other components to process a user input. The system can further include a skill selection component to select a skill to respond to the user input, and skill components to determine an output responsive to the user input. These system components can use context data to select an appropriate skill to determine an appropriate response. The output determined by the skill component is then converted to a device directive that causes a device to perform a corresponding action (e.g., output audio/video, operate a device component, etc.).

In some cases, a user device (e.g., a device 110 shown in FIGS. 1, 7, etc.) may perform one or more of the foregoing processing with respect to a user input. The device can include on-device versions of the above-mentioned spoken language processing components. Processing by the user device may be desirable so that user input data does not have to be provided to a device other than the one the user is speaking to (e.g., no cloud/remotely located system needed). This can be helpful all the time and/or in selective instances (e.g., when the device is in privacy mode, when the device is not connected to the remote system, etc.). Processing by the user device can also reduce a user perceived latency, which refers to an amount of time between when the user starts speaking to the device and the user receiving a response.

The present disclosure relates to techniques for improving the experience and machine-implemented processing of a natural language input on a user device and determining responsive output(s) to the input. Embodiments of the present disclosure can involve use of a component (e.g., a procedural memory component) to process data relating to a natural language input and determining a responsive output. The procedural memory component can be configured to process ASR data, NLU data and/or context data, among other things, and determine responsive output(s) based on information that may have been learned from the system's processing of past natural language inputs. That is, the procedural memory component can be trained to "learn" how a more robust system (with various, additional components and/or more computing, memory, other resources) may process a particular input. Once trained, the procedural memory component (and/or trained components related thereto) can be loaded onto a user device (e.g., device 110) for processing future user inputs, thus allowing the trained components to mimic the system processing and effectively replace processing performed by multiple separate components, such as the skill selection component, the skill component, and the like. In some embodiments, some of the system components may process with respect to a user input in parallel to the procedural memory component, and the output that is generated first (with a certain level of confidence) may be used to respond to the user input.

Depending on system configurations, in some cases, the procedural memory component may determine an output including natural language data, which can be used to generate synthesized speech and/or visual information. The device may perform further processing, such as determining a device directive, to enable presentation of the synthesized speech and/or visual information. Presentation of synthesized speech, visual information or other type of output may help reduce user perceived latency. Additionally or alternatively, the procedural memory component may determine a skill component to respond to the user input, and may also determine an action to be performed by the skill component. For example, a user may say: "Alexa, start a timer for 10 minutes," an ASR component may determine corresponding ASR data, a NLU component may determine corresponding NLU data, and the procedural memory component may process the ASR data and the NLU data to determine the natural language output data "I have started a timer", which may be provided to a speech synthesizer (TTS) component and/or a visual display component to present to the user. The procedural memory component may also determine that a timer skill is to be used to respond to the user input. The procedural memory component may send the NLU data to the timer skill or may send a command to the timer skill to start a timer for 10 minutes. The procedural memory component may determine these outputs based on processing similar past user inputs (e.g., "Start a timer for [number] minutes") and corresponding context data, output data, etc. to determine the specific natural language output and skill component to respond to the user input.

The system can include a learning component that processes past user inputs and corresponding data to learn relationships between user inputs and system outputs. The learned relationships may be used by the procedural memory component to generate an output to a subsequently received input. The learning component may update the learned relationships, and the procedural memory component, based on how user inputs are processed and responded to by other system components. As such, the procedural memory component is capable of responding to user inputs corresponding to new intents, entities, domains, and/or skills.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

An intent corresponds to an action to be performed in response to a natural language input. For example, an input "Play music" may correspond to a PlayMusic intent, an input "Start a timer" may correspond to a SetTimer intent, etc. An entity may represent a person, a place, a thing, etc. that may be used to perform the action. In some cases, a user input may include the entity. For example, an input "Play music by [artist]" may include the entity [artist], an input "Start a timer for 10 minutes" may include the entity "10 minutes", etc.

The techniques described herein, among other things, improve on-device natural language processing. For example, the procedural memory component can improve latency in processing a user input, where such latency can relate to user perceived latency, processing latency, etc. As a further example, the procedural memory component can enable responding to a user input without sending user input data to another system component (e.g., in case communication with the system is interrupted, in case a user enabled privacy mode where input data is not to be sent to the system, etc.). Depending on the size/training of the procedural memory component, it may enable a device to handle a variety of user inputs across many different subject areas.

Some embodiments of the system may involve dialog processing. Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems often need to recognize, retain, and use information collected during more than one input during a back-and-forth or "multi-turn" interaction with the user.

The system may be configured to respond to the user across multiple exchanges between the user and the system. For example, the user may say to the system "Order some apples" and the system may respond "what type of apples would you like?" The user may respond "Fuji" and the system may respond "how many Fuji apples do you want?", to which the user may say "Three." Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as purchasing an item). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 is a conceptual diagram illustrating a system 100 for configuring a procedural memory component 140 to determine outputs responsive to natural language inputs. The system 100 may include a system 120 and multiple devices 110, which may be user devices. The devices 110 may be in communication with the system 120 via one or more networks 199. The network(s) 199 may include the Internet and/or any other wide- or local-area network, and may include wired, wireless, and/or cellular network hardware.

The system 120 may be a cloud-based/remotely located natural language processing system configured to receive natural language inputs (e.g., spoken inputs, text inputs, graphical user interface (GUI) inputs, gesture inputs, etc.) and determine a responsive output. The system 120 may be a more robust natural language processing system, as compared to a user device 110, where the system 120 uses multiple different components/systems/devices, has more computing resources (e.g., processors, memory, etc.), may be configured using more data (e.g., more instances of data, data from multiple different users, etc.) and the like. As such, the system 120 may be, in some respects, more accurate than the user device 110 in processing user inputs. The system 120 may be a primary system for processing user inputs. The system 120 may determine or use various data to determine a responsive output. Example components that may be included in the system 120 for performing processing with respect to user inputs.

The system 120 may receive multiple different user inputs from multiple different devices 110. Referring to FIG. 1, the system 120 may include a memory learning component 135 that may process data corresponding to past user inputs to determine relationships between the user input and the system output. The memory learning component 135 may also determine which of the various available data is relevant in determining the system output.

Data corresponding to a past user input may be referred to collectively as (historical) data 101, which may include user input data 102. The user input data 102 may include (historical) ASR data 104, in the case that the past user input is a spoken input, representing words spoken by a user. The ASR data 104 may be a N-best list of ASR hypotheses or may be one ASR hypothesis. The ASR data 104 may be determined by an ASR component (e.g., ASR component 250) as described below. The user input data 102 may further include (historical) NLU data 106 corresponding to the past user input. The NLU data 106 may be a N-best list of NLU hypotheses or may be one NLU hypothesis. The NLU data 106 may be determined by an NLU component (e.g., NLU component 260) as described below.

Depending on the type of past user input, the user input data 102 may additionally or alternatively include other type of data. For example, the user input data 102 may include data indicative of a gesture performed by the user. As further example, the user input data 102 may include data indicative of a GUI element selected by the user. As yet a further example, the user input data 102 may include text data representing the text inputted by the user.

The data 101 may further include user profile data 108 corresponding to the user that provided the past user input. The user profile data 108 may be stored in a profile storage (e.g., profile storage 270/370), and may include information such as user preferences, user account information, skills enabled for the user account, device/system features (e.g., follow-up mode, privacy mode, a particular voice, brief mode, etc.) enabled for the user account, etc.

The data 101 may also include dialog data 110 corresponding to the past user input. In some cases, the past user input may be an input provided by the user during a dialog session. The dialog data 110 may include user input data, representing user inputs provided during the dialog session, and corresponding system response data, representing system responses presented during the dialog session. The system response data may include an action performed, a skill component that performed the action, natural language output data, etc. The dialog data 110 may identify the user input data and corresponding system response data for individual dialog turns and a sequence in which the dialog turns occur.

The data 101 may further include user history data 112 corresponding to the user that provided the past user input. The user history data 112 may include data corresponding to other past user inputs provided by the user within a time period of receiving the instant past user input (e.g., past user inputs provided in 24 hours prior to the past user input, past user inputs provided in 48 hours prior to the past user input, past user inputs provided in one week prior to the past user input, etc.). The user history data 112 may include ASR data and/or NLU data corresponding to the past user inputs.

The data 101 may also include input context data 114 corresponding to the past user input. The input context data 114 may include device context data corresponding to when the past user input is received. The device context data may be include a device type associated with the device 110 that received the past user input, a device status/state (e.g., active, sleep mode, actively presenting an output, etc.), data being presented via the device, device location, device capabilities, etc. The input context data 114 may include environmental context, such as noisy environment, signal-to-noise ratio for input audio data, background noises, image data representing objects in the environment, etc. The input context data 114 may also include focus data indicative of an in-focus skill component, recently in-focus skill components, in-focus data (e.g., data visible/audible via the device when the past user input is received), etc. The input context data 114 may also include data indicative of other devices 110 that may be located proximate to the device 110 that received or responded to the past user input, and may include information regarding the other devices 110 (e.g., device status/state, output being presented by the device, device type, device capabilities, etc.).

The data 101 may additionally or alternatively include other data corresponding to the past user input, the device 110 that received the past user input, the user that provided the past user input, etc.

In addition to the data 101, the memory learning component 120 may also process output data 118 corresponding to the past user input. The output data 118 may include a skill identifier 122 associated with the skill component used to respond to the past user input. The output data 118 may also include action data 124 indicative of an action(s) performed in response to the past user input. For example, the action data 124 may indicate present weather information for [location], and [date]. As another example, the action data 124 may indicate play [song name], [artist name], and [album]. As yet another example, the action data 124 may indicate turn on [device identifier], where the device identifier may be associated with an appliance such as lights, TV, etc. The action data 124 may include a device identifier or device type identifier associated with the device 110 that performed the action(s). In some embodiments, the action data 124 may be a skill-generated directive to cause performance of an action.

A user device sends events to a system component to indicate that something has occurred, and the system component sends directives to the device instructing it to take action. For example, a user speaking to the device results in a speech recognition event, which can require processing, such as interpreting the user's intent and invoking a skill best suited to handle it. The skill handling the intent results in one or more directives being sent from the system component to the device to enable the device to output a response to the user's intent.

A skill component may send output data and a message (dictating presentment of the output data) to the LRO 228. The message generated by the skill may be referred to as a skill-generated message, a system-generated message, a skill-generated directive, or a system-generated directive.

A directive (e.g., directive 234, a directive generated by a skill, a directive generated by the procedural memory component 140, a directive generated by the system 120, etc.) may include a header, an endpoint, and a payload. The header may identify an action or message being conveyed via the directive. The action or message may be identified using an action/message name, action/message identifier, action/message type, etc. Examples of an identified action/message include TurnOn, AdjustPercentage, TurnUp, TurnDown, TurnOff, PlayBack, StopPlayBack, PlayQueue, ErrorResponse, ReportDeviceState, etc. The header (or payload in some embodiments) may identify a device interface 215 (using, for example, a device interface name, a device interface identifier, etc.) to be used to perform the identified action or respond to the message. The header may also include an identifier (e.g., a directive identifier) to enable further processing (e.g., troubleshooting, logging, etc.) with respect to the directive. The endpoint may identify a device 110 (using, for example, a device identifier) that is to process the directive. In some cases, the directive may identify more than one device that are to process the directive. The payload may include action/message parameters, which may depend on the type of action/message, the type of device interface, and other information. Such parameters may correspond to output data (e.g., audio data, text data, image data, notification data, etc.) to be presented via the device 110, data to be used to perform the action (e.g., a volume value, a temperature value, a media track to be played, etc.), and the like. The payload may also include a payload version (e.g., API version, software version, system version, etc.).

The output data 118 may also include NLG data 126 indicative of one or more natural language outputs presented in response to the past user input. The NLG data 126 may include a natural language output that may be presented as synthesized speech, displayed text, included in a notification, message, or the like, presented along with graphics and other visual elements, or presented in another manner. The NLG data 126 may be text data or other structured data. For example, the NLG data 126 may include synthesized speech markup language (SSML) tags along with text that can be used by a TTS component to generate audio data representing synthesized speech. The NLG data 126 may be generated by a NLG component (e.g., NLG component 375) as described below. The NLG data 126 may represent a natural language output that is presented to the user along with or in addition to any actions performed in response to the past user input. As an example, for a past user input "Set timer for 10 minutes", the corresponding output data 118 may include NLG data 126 representing "I have started the timer", which may be presented as synthesized speech, and may also include skill id 122 associated with a timer skill component, and action data 124 representing an action of setting a timer for 10 minutes performed by the timer skill component.

The output data 118 may additionally or alternatively include other data corresponding to an output(s) presented in responsive to the past user input. Such other data may include output data presented visually (e.g., graphics, images, text, visual indicator like a blinking light, etc.), output data presented audibly (e.g., a beep or other sound), output type (e.g., audio, visual, message, notification, etc.), etc.

The memory learning component 135 may process the data 101 and the output data 118 corresponding to individual past user inputs to determine correspondence data representing a correspondence(s) or a relationship(s) between the past user input and the output data 118. The memory learning component 135 may determine the relationships based on how often the output data 118 (or similar output data) corresponds to similar past user inputs. The memory learning component 135 may determine the relationships by clustering similar past user inputs based on semantic similarity and/or similarity in NLU data 106, then analyzing the corresponding output data 118 to determine the relationships. Alternatively or additionally, the memory learning component 135 may determine the relationships by clustering similar output data 118, then analyzing the corresponding past user inputs to determine the relationships.

In some embodiments, the memory learning component 135 may include a feature selector component 125, which may be configured to determine which of the data 101 is relevant in determining the output data 118. The feature selector component 125 may determine that a portion of the data 101 is relevant if that portion affected or influenced the output data 118. In an example embodiment, the feature selector component 125 may determine groups, using clustering techniques, of similar past user inputs corresponding to similar output data 118. For example, a first group of similar past user inputs may correspond to first output data 118a, a second group of the similar past user inputs may correspond to second output data 118b that is different than the first output data 118a. The feature selector component

125 may then determine which of the data 101 is different for the first group of similar past user inputs and the second group of similar past user inputs, and may determine that the different data caused the first output data 118a to be different from the second output data 118b. For example, the user profile data 108a corresponding to the first group of past user inputs may be different than the user profile data 108b corresponding to the second group of past user inputs.

The feature selector component 125 may use other techniques to determine which of the data 101 is relevant in determining the output data 118.

The feature selector component 125 may include one or more ML models, such as encoders that may generate a representation of the data 101 (e.g., encoded representation). The feature selector component 125 may include separate ML models for the individual types of data included in the data 101. The feature selector component 125 may include one or more ML models such as classifiers, clustering models, etc. that may determine which of the data 101 is relevant in determining the output data 118.

The memory learning component 135 may also include a model building component 130 that may configure/train one or more models 145 to be included in a procedural memory component 140. The model building component 130 may configure various types of models 145, including but not limited to, machine learning models, statistical models, etc. Examples of the models 145 include, but is not limited to, regression models, linear models, clustering models, logistic models, time-series models, decision tree models, classifier models, neural network models, reinforcement learning models, etc. The model building component 130 may process the data 101 and the corresponding output data 118 to determine a relationship(s) between the past user input and the responsive output. The model building component 130 may use data determined by the feature selector component 125, where the data indicates which of the data 101 is relevant in determining the output data 118. In determining the relationships, the model building component 130 may determine a mapping, an association, a correspondence, etc. between the user input data 102 (representing the past user input), the output data 118, and a portion of the data 101 relevant for determining the output data 118.

In some cases, portions of the output data 118 for similar past user inputs may be different. For example, first output data 118a may include a first skill id 122a and first action data 124a, and second output data 118b may include a second skill id 122b and first action data 124b, where the first output data 118a and the second output data 118b may correspond to similar past user inputs. The first skill id 122a and the second skill id 122b may be different, while the first action data 124a and the second action data 124b may be similar. Based on this, the model building component 130 may determine a relationship between the past user input and the action data 124a 124b.

The model building component 130 may employ one or more ML training techniques and may perform one or more training epochs or cycles to configure the models 145. The model building component 130 may also perform test and validation processing using test and validation datasets as known in ML training technique. The model building component 130 can also employ other techniques to configure the models 145. The models 145 may include different type of models, and the model building component 130 may configure these different types of models. Example models 145 may include statistical models, predictive models, fuzzy logic, etc. Based on training epochs and the test and validation processing, the model building component 130 may update data determined by the feature selector component 125. The model building component 130 may also determine one or more statistical algorithms based on processing the data 101 and the output data 118.

The model(s) 145, after configuration, may be included in the procedural memory component 140 for use during runtime operations. In some embodiments, the procedural memory component 140 may be deployed to the device 110 for processing of subsequently received user inputs.

In some embodiments, the memory learning component 135 may determine relationships between past user inputs and responsive outputs for groups of similar users. Similar users may be included in an individual group based on user demographics, user location, types of skills enabled and/or frequently used, types of device/system features enabled and/or frequently used, and other information. The memory learning component 135 may configure a different set of models 145 for individual groups. For example, a first set of ML models 145a may be configured for a first group of similar users and may be deployed to a first group of devices 110 of the first group of the users, and a second set of models 145b may be configured for a second group of similar users and may be deployed to a second group of devices 110 of the second group of users.

The memory learning component 135 may process data corresponding to past user inputs on a periodic basis, and may generate updated models 145 based on the periodic processing. The system 120 may receive multiple user inputs during a given time period, and these user inputs may be different than user inputs received during a prior time period. Additionally or alternatively, the user inputs may be processed by the system 120 in a different manner compared to the prior time period due to, for example, updates to skill components, updates to domain information, updates to intents, updates to entities, etc. The memory learning component 135 may update the models 145 to correspond to updates in how user inputs are processed by the system 120.

Figure 2A:
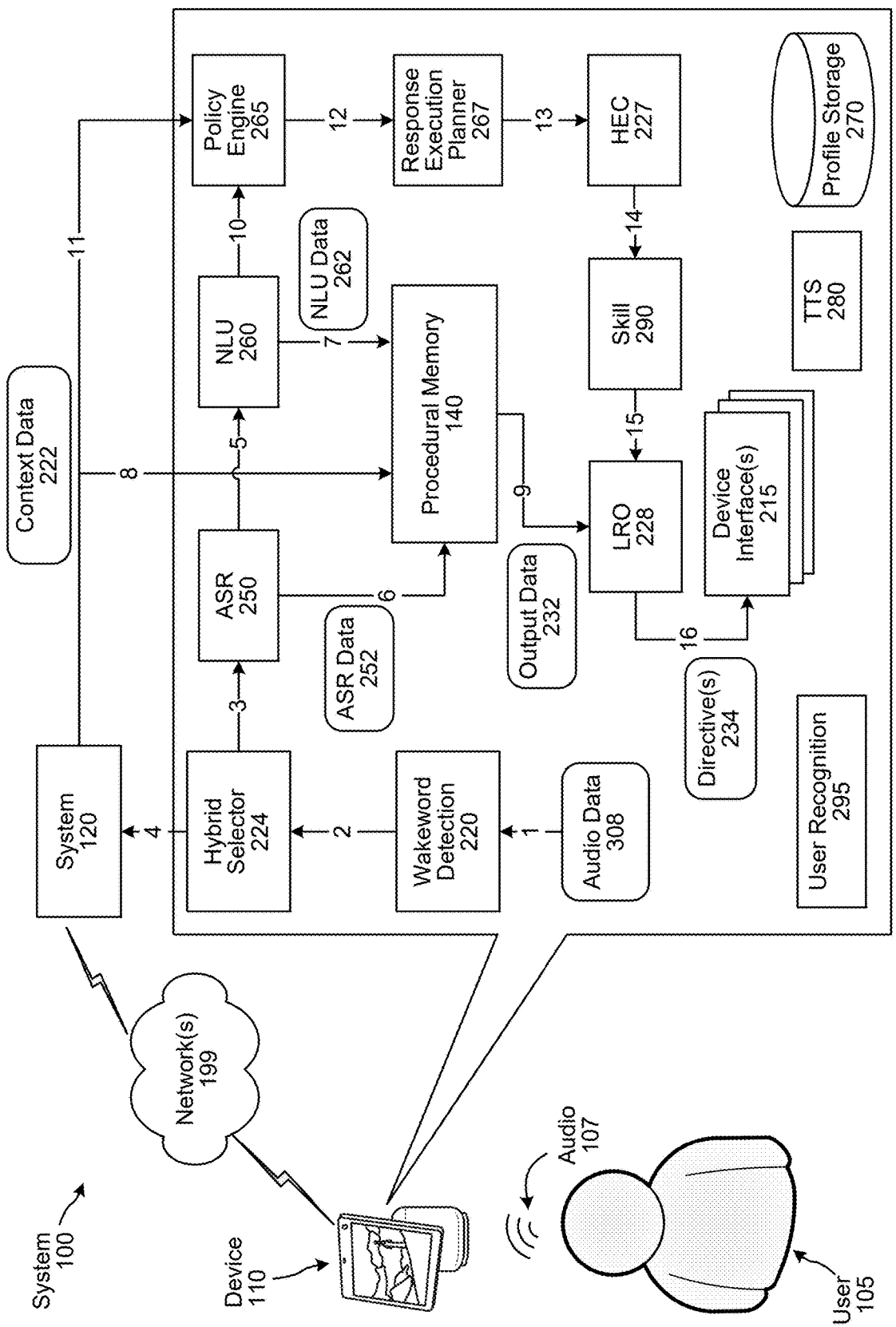
FIG. 2A is a conceptual diagram illustrating use of the procedural memory component, according to embodiments of the present disclosure.

FIG. 2A is a conceptual diagram illustrating use of the procedural memory component 140 during runtime operations. The device 110 may include components to process user inputs and determine responsive outputs. Although the figures and discussion of the present disclosure illustrate certain steps in a particular order, the steps described may be performed in a different order (as well as certain steps removed or added) without departing from the present disclosure.

The device 110 may be local to a user 105. In the example illustrated in FIG. 2A, the user 105 may provide a spoken natural language input. In other examples, the user 105 can provide other types of inputs, such as textual inputs, selection of GUI elements, gesture inputs, etc.

The device 110 may include audio capture component(s), such as a microphone or array of microphones of the device 110, captures audio 107 and creates corresponding audio data 308. Once speech is detected in audio data 308, the device 110 may determine if the speech is directed at the device 110/system 120. In at least some embodiments, such determination may be made using a wakeword detection component 220. The wakeword detection component 220 may receive (step 1) the audio data 308. The wakeword detection component 220 may be configured to detect various wakewords. In at least some examples, each wakeword may correspond to a name of a different digital assistant. An example wakeword/digital assistant name is "Alexa." In another example, input to the system may be in form of text data 313 (shown in FIG. 3), for example as a result of a user typing an input into a user interface of device 110. Other input forms may include indication that the user has pressed a physical or virtual button on device 110, the user has made a gesture, etc. The device 110 may also capture images using camera(s) 518 of the device 110 and may send image data representing those image(s) to the system 120. The image data may include raw image data or image data processed by the device 110 before sending to the system 120. The image data may be used in various manners by different components of the system to perform operations such as determining whether a user is directing an utterance to the system, interpreting a user command, responding to a user command, etc.

The wakeword detection component 220 of the device 110 may process the audio data 308, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data 308 is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example, the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 220 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill components 390 of one or more systems 120.

Once the wakeword is detected by the wakeword detection component 220 and/or input is detected by an input detector, the device 110 may "wake" and begin processing the audio data 308. The wakeword detection component 220 may send (step 2), to a hybrid selector 224, data (e.g., a signal, an indicator, etc.) representing that a wakeword is detected. In embodiments where the device 110 is configured to detect system-directed input, the hybrid selector 224 may receive data representing that system-directed input is detected. A hybrid selector 224 may send (step 3) the audio data 308 to an ASR component 250 and may send (step 4) to the system 120 for processing in parallel. The audio data 308 may include data corresponding to the wakeword; in other embodiments, the portion of the audio corresponding to the wakeword is removed prior to sending the audio data 308 to the ASR component 250 and the system 120.

The ASR component 250 may generate ASR data 252 representing a transcription of the audio data 308. The ASR data 252 may include one or more ASR hypotheses. An ASR hypothesis may be configured as a textual interpretation of the speech in the audio data 308, or may be configured in another manner, such as one or more tokens. Each ASR hypothesis may represent a different likely interpretation of the speech in the audio data 308. Each ASR hypothesis may be associated with a score (e.g., confidence score, probability score, or the like) representing the associated ASR hypothesis correctly represents the speech in the audio data 308. The ASR component 250 (in some embodiments via the hybrid selector 224) may send (step 5) the ASR data 252 to a NLU component 260.

The ASR component 250 transcribes the speech in the audio data based on a similarity between the audio data and pre-established language models. For example, the ASR component 250 may compare the audio data 308 with models for sounds (e.g., subword units, such as phonemes, etc.) and sequences of sounds to identify words that match the sequence of sounds of the speech represented in the audio data. In some embodiments, the ASR component 250 may use acoustic models and language models to determine one or more words represented in the speech in the audio data.

In some embodiments, the ASR component 250 may use a neural network, such as, a recurrent neural network (RNN) (or other type of neural networks) to determine the ASR data corresponding to the speech captured in the audio data. In some embodiments, the ASR component 250 may use a RNN-transducer model, which may feed the prediction from a previous time step (e.g., a predicted token corresponding to a previous audio frame) an input layer to process the next time step (e.g., to predict the next token corresponding to the subsequent/next audio frame).

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the hybrid selector 224. The hybrid selector 224 may send the text data or the ASR data 252, depending on the type of natural language input received, to a NLU component 260.

The NLU component 260 processes the ASR data 252 or text data to determine one or more NLU hypotheses included in NLU data 262 and representing a meaning of the user input. The NLU component 260 may perform intent classification (IC) processing on the ASR data 252 or text data to determine an intent of the natural language input. An intent corresponds to an action to be performed that is responsive to the natural language input. To perform IC processing, the NLU component 260 may communicate with a database of words linked to intents. For example, a music intent database may link words and phrases such as "quiet," "volume off," and "mute" to a <Mute> intent. The NLU component 260 identifies intents by comparing words and phrases in ASR output data or text data to the words and phrases in an intents database. In some embodiments, the NLU component 260 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 260 may also perform named entity recognition (NER) processing on the ASR data 252 or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 260 may be linked to one or more grammar frameworks with entity types to be populated with entity values. Each entity type of a grammar framework corresponds to a portion of ASR data 252 or text data that the NLU component 260 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing using the identified verb to identify an intent. Thereafter, the NLU component 260 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR data 252 that NER processing previously tagged as a grammatical object or object modifier with those identified in the lexicon.

NER processing may include semantic tagging, which is the labeling of a word or combination of words according to their type/semantic meaning. NER processing may include parsing ASR data 252 or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU data 262 including one or more NLU hypotheses, with each NLU hypothesis including an intent and optionally one or more entity types and corresponding entity values. In some embodiments, the NLU component 260 may perform IC processing and NER processing with respect to different skills. One skill may support the same or different intents than another skill. Thus, the NLU data 262 may include multiple NLU hypotheses, with each NLU hypothesis corresponding to IC processing and NER processing performed on the ASR data 252 or text data with respect to a different skill.

The ASR data 252 and the NLU data 262 may be provided (per steps 6 and 7) to the procedural memory component 140 for processing. In some embodiments, the ASR data 252 may be provided (step 6) as soon as the ASR component 250 determines it. In other embodiments, the ASR data 252 may be provided along with the NLU data 262 (per step 7) after the NLU component 260 determines it.

The procedural memory component 140 may also receive (step 8) context data 222 from the system 120. The context data 222 may correspond to the user input, the user 105 and/or the device 110. Examples of data included in the context data 222 are user profile data, dialog data, user history data, input context data, and the like. The user profile data may be stored in a profile storage 370/270, and may be indicative of user preferences, skills enabled, device/system features enabled, user account information, etc. The dialog data may correspond to a dialog session during which the instant user input is provided, and may include data indicative of prior user inputs and corresponding system responses for the dialog session. The user history data may indicate recently accessed skills, recently provided user inputs, etc. The input context data may indicate device context information associated with the device 110, environmental context information, in-focus skill, in-focus data, etc. In some embodiments, some or all of the context data 222 may be determined at the device 110, and provided to the procedural memory component 140 by the hybrid selector 224.

In some embodiments, the procedural memory component 140 may receive other data such as the audio data 308, a wakeword detected signal/a system-directed input detected signal, etc. Another example of the other data received by the procedural memory component 140 may be sentiment data corresponding to the user input. Sentiment data may represent a sentiment/emotion determined by processing the user input. A sentiment detection component (at the device 110 or the system 120) may determine the sentiment/ emotion from an audio signal (e.g., the audio data 308) and/or from the words included in a user input (e.g., the ASR data 252). Another example of the other data received by the procedural memory component 140 may be user identification data (e.g., a user profile id or other data determined by a user recognition component 295). Yet another example of the other data received by the procedural memory component 140 may be image data captured by a camera(s) of the device 110, image data provided by the user 105, image data stored in the profile storage 270, etc. The foregoing other data may be determined by one or more system components that may be included on the device 110 or the system 120.

The procedural memory component 140 may process the ASR data 252, the NLU data 262 and the context data 222 (and/or any other data received) using one or more of the models 145. The procedural memory component 140 may determine output data 232 based on processing the ASR data 252, the NLU data 262 and the context data 222, where the output data 232 may be determined based on the relationships between past user inputs and responsive outputs described herein in relation to FIG. 1. The procedural memory component 140 may determine the output data 232 based on the ASR data 252 and/or the NLU data 262 being similar to one or more past user inputs, and may determine the output data 232 as being similar to the output data 118 corresponding to the similar past user input(s). Also, the procedural memory component 140 may determine the output data 232 based on some or all of the context data 222 being similar to portions of the data 101 corresponding to the past user inputs and relevant in determining the output data 118.

The procedural memory component 140 may provide (step 9) the output data 232 to a local request orchestrator (LRO) 228. Depending on the type of information included in the output data 232, the LRO 228 may determine corresponding directive(s) 234 to cause (step 16) operation of a device interface(s) 215.

In some embodiments, the output data 232 may include NLG data representing a natural language output to be presented to the user 105. The natural language output may be presented as synthesized speech, displayed text, included in a message, a notification or the like, or presented in another manner. In some embodiments, the NLG data may include SSML tags that may be used by a TTS component to generate audio data representing synthesized speech.

In some embodiments, presentation of the natural language output may stop a user perceived latency timer. The user perceived latency timer may begin when the user input is received by the device 110. The user perceived latency timer may be used to determine a time elapsed between receipt of a user input and presentation of a system output. The user perceived latency timer may be used by certain systems to evaluate system performance. Presenting the natural language output may inform the user 105 that the system/device is processing the user input or has processed the user input.

When the output data 232 includes NLG data that is to be presented as synthesized speech, the LRO 228 may generate a directive 234 representing that a device interface 215 corresponding to a speech synthesizer/TTS component is to be invoked to covert the included NLG data to synthesized speech. When the output data 232 includes NLG data that is to be presented as displayed text, the LRO 228 may generate a directive 234 representing that a device interface 215 corresponding to a display interface is to be invoked to display the included NLG data.

In some embodiments, the output data 232 may additionally or alternatively include a skill identifier associated with a skill component 290 to be used to respond to the user input. In such cases, the LRO 228 may send the NLU data 262 to the skill component 290 associated with the skill identifier. The skill component 290 may process the NLU data 262 and determine output data responsive to the user input.

In some embodiments, the output data 232 may additionally or alternatively include action data representing an action to be performed in response to the user input. In such cases, the LRO 228 may send a command to the skill component 290 associated with the skill identifier (if one is included in the output data 232) to perform the action indicated in the action data.

The device 110 may process the NLU data 262, in parallel to the procedural memory component 140, using other components to determine a responsive output. A policy engine 265 may receive (step 10) and process the NLU data 262, and may receive (step 11) and process the context data 222, and may select one or more NLU hypotheses from the NLU data 262 that correspond to the user input. The policy engine 265 may receive/use additional data such as user profile data associated with the user 105, which may indicate user preferences, features enabled or disabled at the device (e.g., follow-up mode, do not disturb mode, away mode, brief mode, etc.), and other information. The policy engine 265 may provide (step 12), to a response execution planner 267, data determined based on its processing.

A response execution planner 267 may determine one or more skill components 290 capable of responding to the user input. The response execution planner may perform operations similar to a skill selection component 365 included in the system 120 and described below in relation to FIG. 3. The response execution planner 267 may determine the one or more skill components 290 based on which skill components are enabled for the device 110 and/or the user 105. The response execution planner 267 may send (step 13), to a hybrid execution controller 227, data indicative, among other things, of the selected skill component.

A hybrid execution controller 227 may send (step 14) a command, along with the NLU data 262, to the skill component 290 selected by the response execution planner 267. The skill component 290 may process the NLU data 262 to determine output data responsive to the user input. The skill component 290 may send (step 15) the output to the LRO 228. The LRO 228 may determine the directive(s) 234, corresponding to the output data from the skill component 290, to cause (step 16) operation of the device interface(s) 215.

For description purposes the processing performed by the policy engine 265, the response execution planner 267, the HEC 227, and then the skill component 290 may be referred to as a first processing pipeline. In some cases, the procedural memory component 140 may determine the output data 232 before the first processing pipeline determines output data. That is, the LRO 228 may receive the output data 232 before receiving data from the first processing pipeline.

In some cases, the procedural memory component 140 may not be able to determine output data for the user input, for example, because the user input or corresponding context data could not be mapped to a similar past user input, the procedural memory component 140 is not confident in its processing, etc. In such cases, the LRO 228 may perform further processing with respect to output data determined by the first processing pipeline.

In yet other cases, neither the procedural memory component 140 nor the first processing pipeline may be able to determine output data responsive to the user input. In such cases, the system 120 may determine output data responsive to the user input, and may cause the device 110 to present the output data.

As described above, the device 110 may perform speech processing using two different components (e.g., the ASR component 250 and the NLU component 260). In at least some embodiments, the device 110 may implement a spoken language understanding (SLU) component configured to process the audio data 308 to determine NLU data.

The SLU component may be equivalent to a combination of the ASR component 250 and the NLU component 260. Yet, the SLU component may process the audio data 308 and directly determine the NLU data 262, without an intermediate step of generating ASR data. As such, the SLU component may take audio data 308 representing a spoken natural language input and attempt to make a semantic interpretation of the spoken natural language input. That is, the SLU component may determine a meaning associated with the spoken natural language input and then implement that meaning. For example, the SLU component may interpret audio data 308 representing a spoken natural language input in order to derive a desired action. The SLU component may output a most likely NLU hypothesis, or multiple NLU hypotheses associated with respective confidence or other scores (such as probability scores, etc.).

A skill component 290 may be software running on the device 110 that is akin to a software application. That is, a skill component 290 may enable the device 110 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The device 110 may be configured with more than one skill component 290. For example, a weather service skill component may enable the device 110 to provide weather information, a smart home skill component may enable the device 110 to control appliances, a restaurant skill component may enable the device 110 to order food with respect to the restaurant's online ordering system, etc. A skill component 290 may operate in conjunction with the system 120, the skill system(s) 325 and other system components in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill component 290 may be associated with a domain, a non-limiting list of which includes a smart home domain, a music domain, a video domain, a weather domain, a communications domain, a flash briefing domain, a shopping domain, and a custom domain.

The device 110 may include a TTS component 280 that generates audio data including synthesized speech. The data input to the TTS component 280 may come from a skill component 290, the procedural memory component 140, the LRO 228 or another system component.

In one method of synthesis called unit selection, the TTS component 280 matches input data against a database of recorded speech. The TTS component 280 selects matching units of recorded speech and concatenates the units together to form audio data. In another method of synthesis called parametric synthesis, the TTS component 3D0 varies parameters such as frequency, volume, and noise to determine audio data including an artificial speech waveform. Parametric synthesis uses a computerized voice generator, sometimes called a vocoder.

The device 110 may include a user recognition component 295. The user recognition component 295 may recognize one or more users using various data. The user recognition component 295 may take as input the audio data 308. The user recognition component 295 may perform user recognition by comparing speech characteristics, in the audio data 308, to stored speech characteristics of users. The user recognition component 295 may additionally or alternatively perform user recognition by comparing biometric data (e.g., fingerprint data, iris data, retina data, etc.), received by the device 110 in correlation with a natural language input, to stored biometric data of users. The user recognition component 295 may additionally or alternatively perform user recognition by comparing image data (e.g., including a representation of at least a feature of a user), received by the device 110 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that received the natural language input.

The user recognition component 295 determines whether a natural language input originated from a particular user. For example, the user recognition component 295 may determine a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform processing by system components, for example to determine the context data 222.

The device 110 may include profile storage 270. The profile storage 270 may include a variety of data related to an individual user(s) or groups of users of the device 110. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; device/system feature enablement data; and/or other data.

The profile storage 270 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skill components 290 that the user has enabled. When a user enables a skill component 290, the user is providing the device 110 with permission to allow the skill component 290 to execute with respect to the user's natural language inputs. If a user does not enable a skill component 290, the device 110 may not execute the skill component 290 with respect to the user's natural language inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The device 110 may include a natural language generation (NLG) component, or similar capabilities may be included in another component of the device 110. The NLG component can generate natural language data for purposes of presenting synthesized speech, displayed text, etc. to a user. For example the NLG component may generate natural language output corresponding to instructions corresponding to a particular action for the user to perform. The NLG component may include one or more trained models configured to output natural language output appropriate for a particular input.

Figure 3:
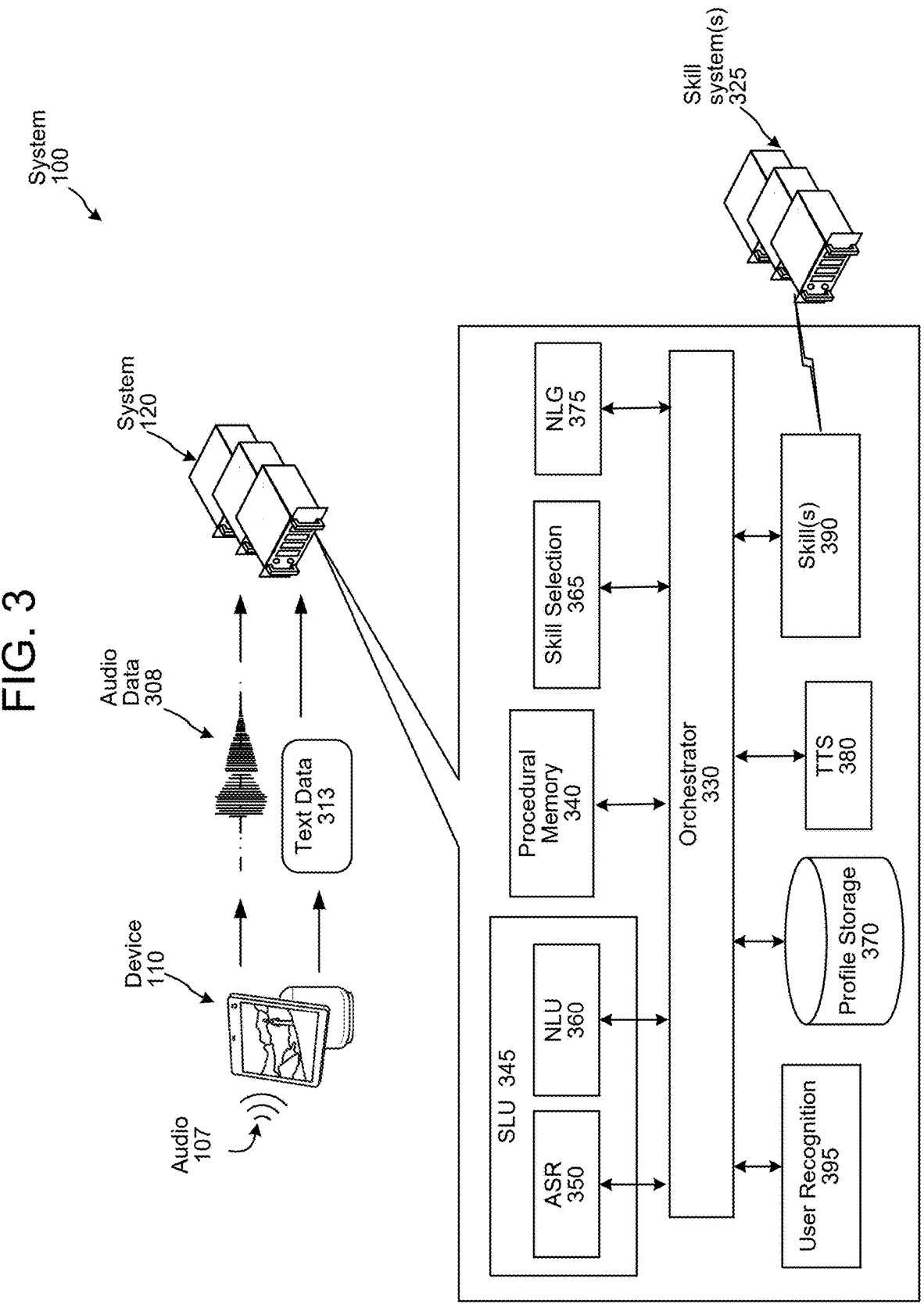
FIG. 3 is a conceptual diagram of components of the system, according to embodiments of the present disclosure.

Although the components of FIG. 2A may be illustrated as part of the device 110, the components may be arranged in other systems (such as in the system 120 as illustrated in FIG. 3, or in other device(s) altogether) without departing from the disclosure.

In at least some embodiments, the on-device components may not have the same capabilities as the components implemented by the system 120. For example, the on-device components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 224, of the device 110, may include a hybrid proxy (HP) configured to proxy traffic to/from the system 120. For example, the HP may be configured to send messages to/from the HEC 227. For example, command/directive data received from the system 120 can be sent to the HEC 227 using the HP. The HP may also be configured to allow the audio data 308 to pass to the system 120 while also receiving (e.g., intercepting) this audio data 308 and sending the audio data 308 to the HEC 227.

In at least some embodiments, the LRO 228 may initiate the operations of on-device components when the audio data 308 becomes available. In general, the hybrid selector 224 may control execution of on-device processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Figure 2B:
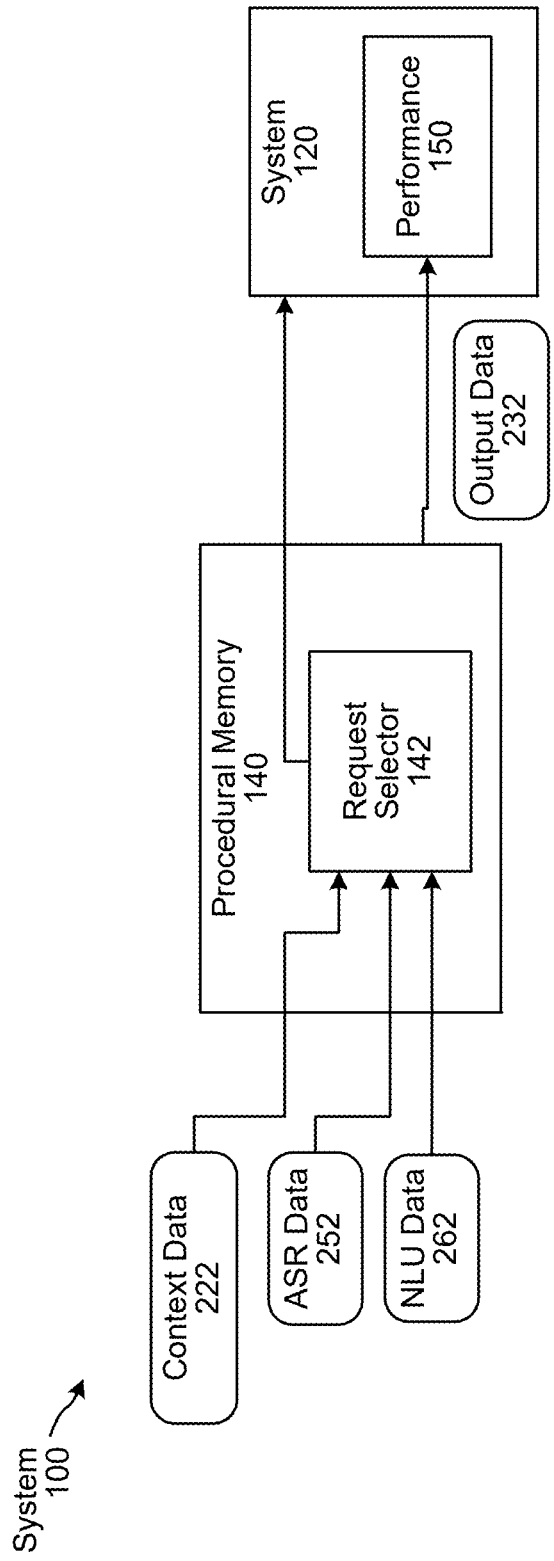
FIG. 2B is a conceptual diagram illustrating a performance component configured to evaluate processing of a user input by the procedural memory component with respect to processing of the user input by the system, according to embodiments of the present disclosure.

FIG. 2B illustrates a performance component 150 implemented at the system 120 and configured to evaluate processing performed by the procedural memory component with respect to processing performed by the system 120. In other embodiments, the performance component 150 may be implemented at another system or device of the system 100. In some embodiments, the procedural memory component 140 may include a request selector component 142. The request selector component 142 may determine that a portion (e.g., a percentage, a number, etc.) of the user inputs received by the procedural memory component 140 are to be processed by the system 120. For that portion of the user inputs the procedural memory component 140 may send data (e.g., an indicator, a signal, data corresponding to the user input, etc.) to the system 120, where receipt of such data may cause the system 120 to perform processing (as described in relation to FIG. 3) with respect to the indicated user inputs. For example, the request selector component 142 may be configured to send ten percent of the user inputs received by the device 110 and the procedural memory component 140 to the system 120 for processing. The procedural memory component 140 may also process such user inputs in addition to the system 120 processing them. The system 120 may determine output data responsive to the individual user inputs by performing speech processing, natural language processing, determining a skill component 390 to respond to the user input, determining NLG data, determining synthesized speech, etc. The output data determined by the system 120 may be used by the performance component 150 to evaluate the processing performed by the procedural memory component 140.

The system 120 may be configured to evaluate processing by the procedural memory component 140 with respect to a group of users, a particular domain, a particular skill, a particular intent, a particular type of user input, etc. The request selector component 142 may determine the portion of the user inputs to provide to the system 120 based on the user inputs corresponding to a particular type of user, a particular domain, a particular skill, a particular intent, a particular type of user input, etc. The request selector component 142 may make this determination based on the context data 222, the ASR data 252 and the NLU data 262. For example, the request selector component 142 may determine, using user profile data, that a first user input corresponds to the particular user type, and may provide the first user input to the system 120 for processing. As another example, the request selector component 142 may determine, using the NLU data 262, that a second user input corresponds to the particular domain, and may provide the second user input to the system 120 for processing.

The performance component 150 may receive, from the procedural memory component 140, the output data 232 corresponding to an individual user input that was also provided to the system 120 for processing. The performance component 150 may also receive the (system) output data determined by the system 120 for the particular user input. The performance component 150 may process the output data 232 with respect to the system output data (e.g., compare them) to determine a metric (e.g., an accuracy metric) based on a similarity (e.g., exact matching, partial matching, no matching, etc.) between the output data 232 and the system output data. The metric may be based on whether a portion of the output data 232 matches or is similar to the system output data. For example, the performance component 150 may compare the NLG output determined by the procedural memory component 140 and the system 120, and may determine a similarity based on words matching, semantic similarity, etc. As another example, the performance component 150 may compare the skill component selected by the procedural memory component 140 and the system 120. As yet another example, the performance component 150 may compare the action data determined by the procedural memory component 140 and the system 120. The metric may be a value representing a similarity between the outputs, an accuracy value represented as a number or a percentage, or a Boolean value indicating whether the outputs are similar (e.g., satisfies a similarity threshold).

The performance component 150 may also evaluate a latency metric of the procedural memory component 140, which may involve determining how long it takes the procedural memory component 140 to process the user input, and whether that satisfies a latency threshold. If the latency threshold is not satisfied, the procedural memory component 140 may be retrained/updated.

The performance component 150 may determine metrics for individual user inputs, may aggregate (e.g., sum up, average, etc.) the metrics to determine an overall metric, and may determine whether processing by the procedural memory component 140 satisfies a performance condition (e.g., whether the aggregated metric satisfies a threshold metric). When the processing by the procedural memory component 140 does not satisfy the performance condition, the system 120 may retrain/update the procedural memory component 140. Such retraining/updating may be performed using past user inputs that are received by the system 120 within a given time period (e.g., a recent time period, past week, past month, past 48 hours, etc.). The performance component 150 may evaluate the procedural memory component 140 on a periodic basis (e.g., once a week, every other day, etc.).

In some embodiments, the performance component 150 may process metrics corresponding to various procedural memory components 140 installed at different devices 110 to determine whether the procedural memory component 140 is to be retrained/updated. The retrained/updated procedural memory component 140 may be deployed to the individual devices 110.

The performance component 150 may use specific performance conditions to evaluate the procedural memory component 140, where such performance conditions may correspond to a particular group of users, a particular domain, a particular skill, a particular type of interaction, etc. For example, a first performance condition (e.g., a first threshold metric) may be used to determine whether processing by the procedural memory component 140 is satisfactory for a group of users (e.g., a group of users with similar demographics, a group of users that provide similar user inputs, a group of users with similar preferences, etc.). As a further example, a second performance condition (e.g., a second threshold metric) may be used to determine whether processing by the procedural memory component 140 is satisfactory for user inputs relating to a particular domain (e.g., a shopping domain, a music domain, a video domain, etc.).

The system 100 may compare predictions/output data determined by the procedural memory component 140 with the output data determined by the system 120. This may be performed on a periodic basis after the procedural memory component 140 is deployed to one or more devices 110 and/or may be performed prior to the procedural memory component 140 is deployed to a device 110. In some embodiments, until the procedural memory component 140 gains confidence in the predictive accuracy for various user inputs, the procedural memory component 140 may operate in the background (on the system 120 and/or the device 110), and then may automatically shift into active mode once the accuracy risk of using the procedural memory component's 140 predicted outputs is outweighed by a latency benefit (e.g., the procedural memory component 140 processing latency is less than the system's 120 latency). The system 100 may use reinforcement learning and multi-arm bandit methodology to continuously evaluate the procedural memory component's 140 predictive accuracy against the system's 120 processing, in case there is a change in the domain, skill, user behavior, etc. The procedural memory component 140 may improve processing with respect to user inputs by leveraging context data specific to users as well as aggregating learnings from a broader group of users to reduce latency in responding to individual users.

The system 100 may operate using various components as illustrated in FIG. 3. The various components may be located on a same or different physical devices. Communication between various components may occur directly or across a network(s) 199.

When speech is detected in the audio data 308, the hybrid selector 224 may send the audio data 308 to the system 120. When another type of user input is detected, the hybrid selector 224 may send corresponding input data to the system 120 for processing. The system 120 may include an orchestrator component 330 configured to, among other things, coordinate data transmissions between components of the system 120. The orchestrator component 330 may receive the audio data 308 from the device 110, and send the audio data 308 to an ASR component 350. The ASR component 350 may process the audio data 308 in a similar manner as the ASR component 250 described above.

As described above, the system 120 may perform speech processing using two different components (e.g., the ASR component 350 and the NLU component 360). In at least some embodiments, the system 120 may implement a spoken language understanding (SLU) component 345 configured to process audio data 308 to determine NLU output data.

The SLU component 345 may be equivalent to a combination of the ASR component 350 and the NLU component 360. Yet, the SLU component 345 may process audio data 308 and directly determine the NLU output data, without an intermediate step of generating ASR output data. As such, the SLU component 345 may take audio data 308 representing a spoken natural language input and attempt to make a semantic interpretation of the spoken natural language input. That is, the SLU component 345 may determine a meaning associated with the spoken natural language input and then implement that meaning. For example, the SLU component 345 may interpret audio data 308 representing a spoken natural language input in order to derive a desired action. The SLU component 345 may output a most likely NLU hypothesis, or multiple NLU hypotheses associated with respective confidence or other scores (such as probability scores, etc.).

The system 120 may include a skill selection component 365, which may incorporate other information to rank potential interpretations determined by the NLU component 360. The skill selection component 365 may include a statistical component that produces a ranked list of intent/skill pairs with associated confidence scores. Each confidence score may indicate an adequacy of the skill's execution of the intent with respect to NLU results data associated with the skill. The skill selection component 365 may operate one or more trained models configured to process the NLU data, skill result data (which may be provided by the skill components 390), and the other data in order to output ranked output data. The ranked output data may include an N-best list where the NLU hypotheses in the NLU data are reordered such that the N-best list in the ranked output data represents a prioritized list of skills to respond to a user input as determined by the skill selection component 365. The ranked output data may also include (either as part of an N-best list or otherwise) individual respective scores corresponding to skills where each score indicates a probability that the skill (and/or its respective result data) corresponds to the user input.

The system may be configured with thousands, tens of thousands, etc. skills. The skill selection component 365 enables the system to better determine the best skill to execute the user input. For example, first and second NLU hypotheses in the NLU data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The skill selection component 365 (or other scheduling component such as orchestrator component 330) may solicit the first skill and the second skill to provide potential result data based on the first NLU hypothesis and the second NLU hypothesis, respectively. For example, the skill selection component 365 may send the first NLU hypothesis to the first skill 390a along with a request for the first skill 390a to at least partially execute with respect to the first NLU hypothesis. The skill selection component 365 may also send the second NLU hypothesis to the second skill 390b along with a request for the second skill 390b to at least partially execute with respect to the second NLU hypothesis. The skill selection component 365 receives, from the first skill 390a, first result data generated from the first skill 390a's execution with respect to the first NLU hypothesis. The skill selection component 365 also receives, from the second skill 390b, second results data generated from the second skill 390b's execution with respect to the second NLU hypothesis.

The result data, from the skill component 390, may include various portions. For example, the result data may include content (e.g., audio data, text data, and/or video data) to be output to a user. The result data may also include a unique identifier used by the system(s) 120 and/or the skill system(s) 125 to locate the data to be output to a user. The result data may also include an instruction. For example, if the user input corresponds to "turn on the light," the result data may include an instruction causing the system to turn on a light associated with a profile of the device (110a/110b) and/or user.

The skill selection component 365 may consider the first result data and the second result data to alter the first confidence score and the second confidence score of the first NLU hypothesis and the second NLU hypothesis, respectively. That is, the skill selection component 365 may generate a third confidence score based on the first result data and the first confidence score. The third confidence score may correspond to how likely the skill selection component 365 determines the first skill will correctly respond to the user input. The skill selection component 365 may also generate a fourth confidence score based on the second result data and the second confidence score. One skilled in the art will appreciate that a first difference between the third confidence score and the fourth confidence score may be greater than a second difference between the first confidence score and the second confidence score. The skill selection component 365 may also consider the other data to generate the third confidence score and the fourth confidence score. While it has been described that the skill selection component 365 may alter the confidence scores associated with first and second NLU hypotheses, one skilled in the art will appreciate that the skill selection component 365 may alter the confidence scores of more than two NLU hypotheses. The skill selection component 365 may select the result data associated with the skill 390 with the highest altered confidence score to be the data output in response to the current user input. The skill selection component 365 may also consider the ASR data to alter the NLU hypotheses confidence scores.

The orchestrator component 330 may, prior to sending the NLU data to the skill selection component 365, associate intents in the NLU hypotheses with skills 390. For example, if a NLU hypothesis includes a <PlayMusic> intent, the orchestrator component 330 may associate the NLU hypothesis with one or more skills 390 that can execute the <PlayMusic> intent. Thus, the orchestrator component 330 may send the NLU data, including NLU hypotheses paired with skills 390, to the skill selection component 365. In response to ASR data corresponding to "what should I do for dinner today," the orchestrator component 330 may generates pairs of skills 390 with associated NLU hypotheses corresponding to:

Skill 1/NLU hypothesis including <Help> intent
Skill 2/NLU hypothesis including <Order> intent
Skill 3/NLU hypothesis including <DishType> intent The skill selection component 365 queries each skill 390, paired with a NLU hypothesis in the NLU data, to provide result data based on the NLU hypothesis with which it is associated. That is, with respect to each skill, the skill selection component 365 colloquially asks the each skill "if given this NLU hypothesis, what would you do with it."

According to the above example, the skill selection component 365 may send skills 390 the following data:

Skill 1: First NLU hypothesis including <Help> intent indicator
Skill 2: Second NLU hypothesis including <Order> intent indicator
Skill 3: Third NLU hypothesis including <DishType> intent indicator The skill selection component 365 may query each of the skills 390 in parallel or substantially in parallel.

The system 120 may include one or more skill components 390 and/or may communicate with one or more skill systems 325. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 390 may operate in conjunction with the system 120 and other devices, such as the device 110, a restaurant electronic ordering system, a taxi electronic booking system, etc. in order to complete certain functions. Inputs to a skill component 390 may come from speech processing interactions or through other interactions or input sources.

A skill 390 may be associated with a domain, a non-limiting list of which includes a smart home domain, a music domain, a video domain, a weather domain, a communications domain, a flash briefing domain, a shopping domain, and a custom domain.

The system 120 may include a TTS component 380 that may process in a similar manner as the TTS component 280. The system 120 may include a user recognition component 395 that may process in a similar manner as the user recognition component 295.

The system 120 may include profile storage 370. The profile storage 370 may include a variety of data related to individual users, groups of users, devices, etc. that interact with the system 120. The data stored in the profile storage 370 may be similar to the data stored in the profile storage 270. The user profiles stored in the profile storage 370 may include skill identifiers of skill systems 325 that the user has enabled. When a user enables a skill system 325, the user is providing the system 120 with permission to allow the skill system 325 to execute with respect to the user's natural language inputs. If a user does not enable a skill system 325, the system 120 may not execute the skill system 325 with respect to the user's natural language inputs.

The system 120 may include a NLG component 375 that can generate natural language data for purposes of presenting synthesized speech, displayed text, etc. to a user. For example the NLG component 375 may generate natural language output corresponding to instructions corresponding to a particular action for the user to perform. The NLG component 375 may generate appropriate natural language data for various outputs as described herein. The NLG component 375 may include one or more trained models configured to output natural language data appropriate for a particular input. The data output by the NLG component 375 may become input for the TTS component 380. Alternatively or in addition, the TTS component 380 may receive data from a skill component 390 or other system component for processing.

The NLG component 375 may include a trained model. The NLG component 375 may generate natural language output data such that the data has a natural feel and, in some embodiments, includes words and/or phrases specifically formatted for a requesting individual. The NLG component 375 may use templates to formulate system responses. And/or the NLG component 375 may include models trained from the various templates for forming the natural language output data. For example, the NLG component 375 may analyze transcripts of local news programs, television shows, sporting events, or any other media program to obtain common components of a relevant language and/or region. As one illustrative example, the NLG component 375 may analyze a transcription of a regional sports program to determine commonly used words or phrases for describing scores or other sporting news for a particular region. The NLG component 375 may further receive, as inputs, a dialog history, an indicator of a level of formality, and/or a command history or other user history such as the dialog history.

The NLG component 375 may generate dialog data based on one or more response templates. Further continuing the example above, the NLG component 375 may select a template in response to the question, "What is the weather currently like?" of the form: "The weather currently is $weather_information$." The NLG component 375 may analyze the logical form of the template to produce one or more textual responses including markups and annotations to familiarize the response that is generated. In some embodiments, the NLG component 375 may determine which response is the most appropriate response to be selected. The selection may, therefore, be based on past responses, past questions, a level of formality, and/or any other feature, or any other combination thereof. Responsive audio data representing the response generated by the NLG component 375 may then be generated using the text-to-speech component 380.

The system 120 may also include a procedural memory component 340, which in some embodiments may be the same as the procedural memory component 140. In other embodiments, the procedural memory component 340 may perform similar processing to the procedural memory component 140, but may employ different models, data, algorithms, etc., and/or may determine different output data responsive to a user input depending on the data available to the system 120. In some cases, data available to the system 120 may be different than the data available to the device 110 and the procedural memory component 140.

Although the components of FIG. 3 may be illustrated as part of system(s) 120, device 110, or otherwise, the components may be arranged in other device(s) (such as in device 110 if illustrated in system(s) 120 or vice-versa, or in other device(s) altogether) without departing from the disclosure.

The foregoing describes illustrative components and processing of the system 120. The following describes illustrative components and processing of the device 110. As illustrated in FIG. 3, in at least some embodiments the system 120 may receive the audio data 308 from the device 110, to recognize speech corresponding to a spoken natural language in the received audio data 308, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis may be selected as usable to respond to a natural language input, and local response data may be sent (e.g., local NLU output data, local knowledge base information, internet search results, and/or local directive data) to the HEC 227, such as a "ReadyToExecute" response. The HEC 227 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 308 to the system 120, and the response data from the system 120 may include the unique identifier to identify to which natural language input the response data corresponds.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
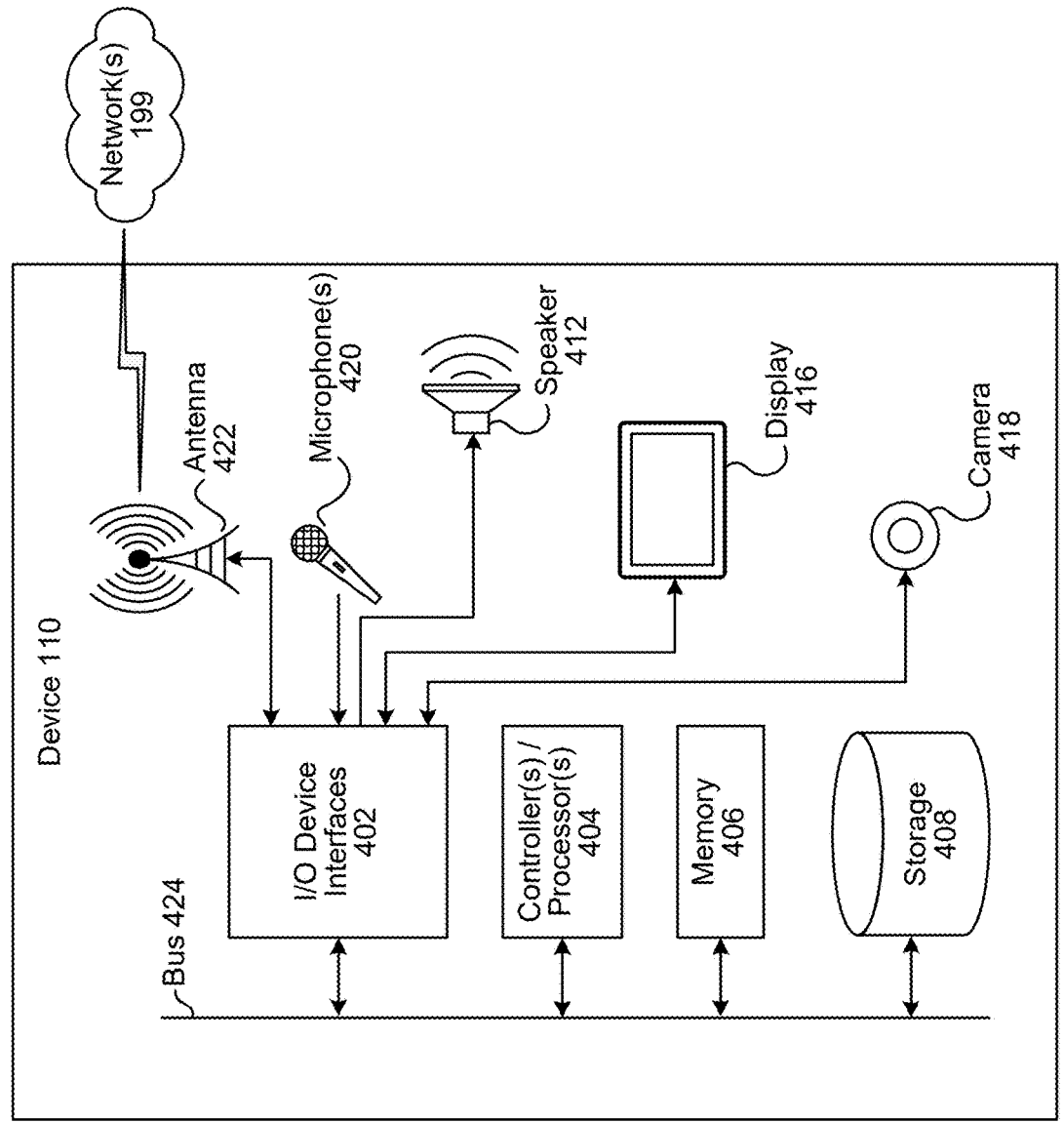
FIG. 4 is a conceptual diagram illustrating components that may be included in a device, according to embodiments of the present disclosure.
Figure 5:
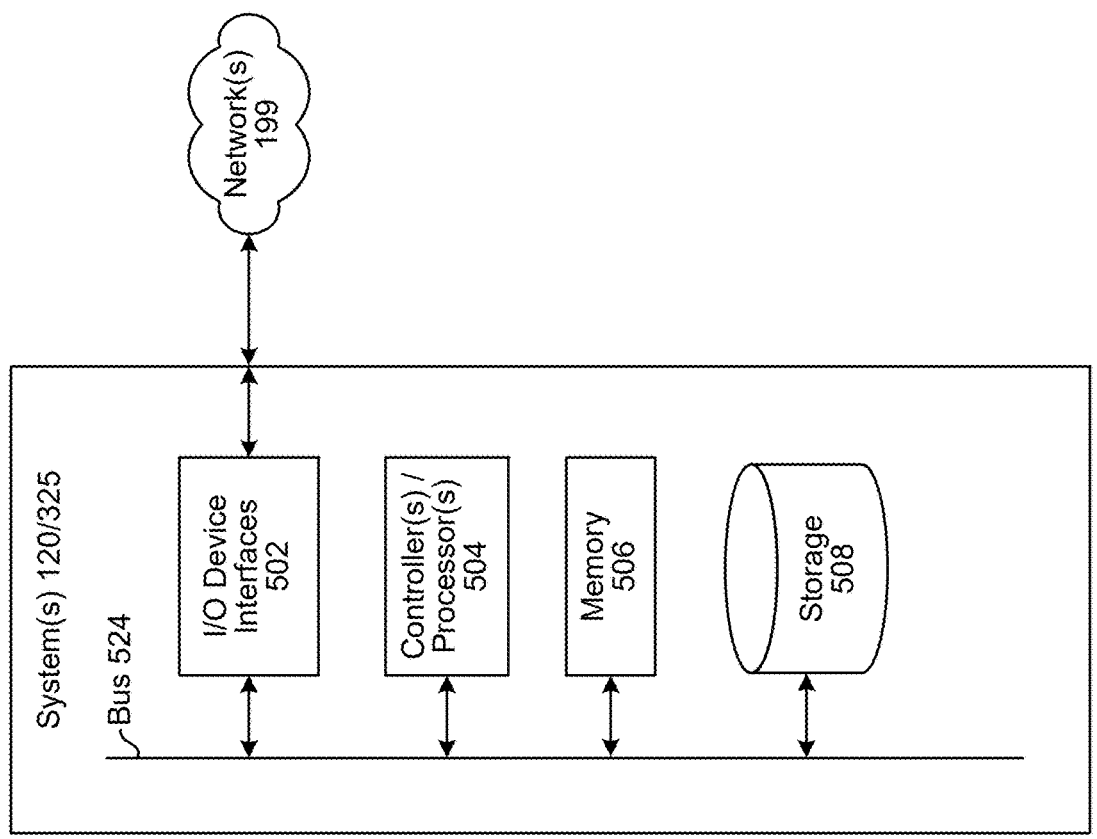
FIG. 5 is a block diagram conceptually illustrating example components of a system, according to embodiments of the present disclosure.

FIG. 4 is a block diagram conceptually illustrating a device 110 that may be used with the system. FIG. 5 is a block diagram conceptually illustrating example components of a remote device, such as the natural language command processing system 120, which may assist with ASR processing, NLU processing, etc., and a skill system 325. A system (120/325) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/325) may be included in the overall system 100 of the present disclosure, such as one or more natural language processing systems 120 for performing ASR processing, one or more natural language processing systems 120 for performing NLU processing, one or more skill systems 325, etc. In operation, each of these systems may include computer-readable and computer-executable instructions that reside on the respective device (120/325), as will be discussed further below.

Each of these devices (110/120/325) may include one or more controllers/processors (404/504), which may each include a central processing unit (CPU) for processing data and computer-readable instructions, and a memory (406/506) for storing data and instructions of the respective device. The memories (406/506) may individually include volatile random access memory (RAM), non-volatile read only memory (ROM), non-volatile magnetoresistive memory (MRAM), and/or other types of memory. Each device (110/120/325) may also include a data storage component (408/508) for storing data and controller/processor-executable instructions. Each data storage component (408/508) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (402/502).

Computer instructions for operating each device (110/120/325) and its various components may be executed by the respective device's controller(s)/processor(s) (404/504), using the memory (406/506) as temporary "working" storage at runtime. A device's computer instructions may be stored in a non-transitory manner in non-volatile memory (406/506), storage (408/508), or an external device(s). Alternatively, some or all of the executable instructions may be embedded in hardware or firmware on the respective device in addition to or instead of software.

Each device (110/120/325) includes input/output device interfaces (402/502). A variety of components may be connected through the input/output device interfaces (402/502), as will be discussed further below. Additionally, each device (110/120/325) may include an address/data bus (424/524) for conveying data among components of the respective device. Each component within a device (110/120/325) may also be directly connected to other components in addition to (or instead of) being connected to other components across the bus (424/424).

Referring to FIG. 4, the device 110 may include input/output device interfaces 402 that connect to a variety of components such as an audio output component such as a speaker 412, a wired headset or a wireless headset (not illustrated), or other component capable of outputting audio. The device 110 may also include an audio capture component. The audio capture component may be, for example, a microphone 420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 416 for displaying content. The device 110 may further include a camera 418.

Via antenna(s) 422, the input/output device interfaces 402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (402/502) may also include communication components that allow data to be exchanged between devices such as different physical servers in a collection of servers or other components.

The components of the device(s) 110, the natural language command processing system 120, or a skill system 325 may include their own dedicated processors, memory, and/or storage. Alternatively, one or more of the components of the device(s) 110, the natural language command processing system 120, or a skill system 325 may utilize the I/O interfaces (402/502), processor(s) (404/504), memory (406/506), and/or storage (408/508) of the device(s) 110, natural language command processing system 120, or the skill system 325, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 325, as described herein, are illustrative, and may be located as a stand-alone device or may be included, in whole or in part, as a component of a larger device or system. As can be appreciated, a number of components may exist either on a system 120 and/or on device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 6:
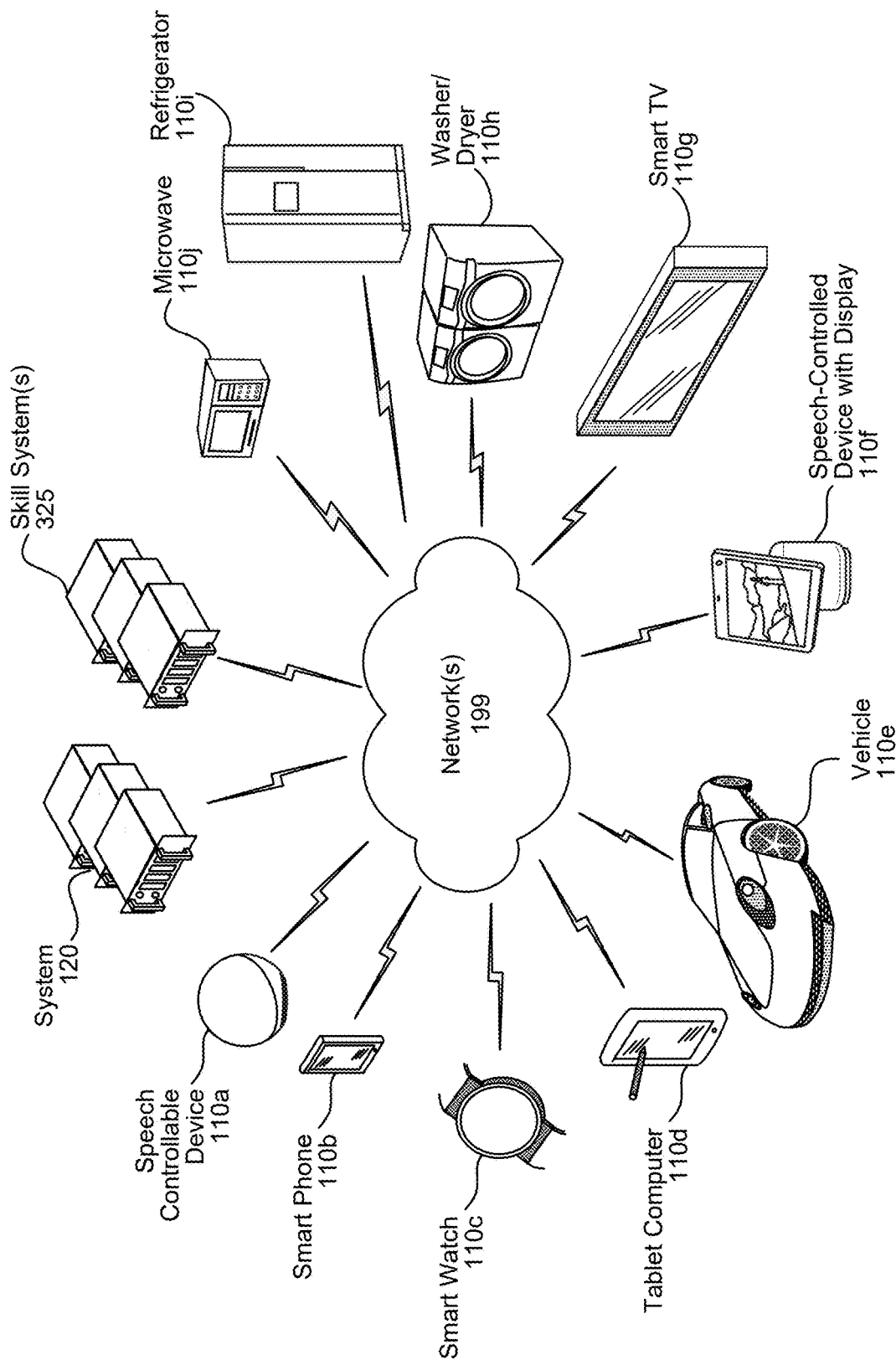
FIG. 6 illustrates an example of a computer network for use with the overall system, according to embodiments of the present disclosure.

As illustrated in FIG. 6, multiple devices (110a-110j, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110a, a smart phone 110b, a smart watch 110c, a tablet computer 110d, a vehicle 110e, a speech-controlled device with display 110f, a display/smart television 110g, a washer/dryer 110h, a refrigerator 110i, and a microwave 110j, etc. may be connected to the network(s) 199 through a wireless service provider, over a Wi-Fi or cellular network connection, or the like. Other devices are included as network-connected support devices, such as the natural language command processing system 120, the skill system(s) 325, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving input audio data representing a spoken natural language input;
   determining automatic speech recognition (ASR) data representing a transcription of the input audio data;
   processing, using a component, the ASR data to determine first output data responsive to the spoken natural language input, the first output data representing a natural language output;
      wherein the component is configured using past user inputs and corresponding past system outputs that were determined by a natural language processing system that uses more computing resources than the component with respect to processing natural language inputs;
   processing, using the natural language processing system, the ASR data to determine second output data responsive to the spoken natural language input;
   determining that the first output data is different than the second output data; and
   based at least in part on the first output data being different than the second output data, configuring the component using additional past user inputs and corresponding additional past system outputs, wherein the component is to be used to process future natural language inputs received by a user device that is remotely located from the natural language processing system.

2. The computer-implemented method of claim 1, further comprising:
   receiving first historical ASR data associated with a first past spoken natural language input, the first historical ASR data being determined by the natural language processing system;
   receiving second historical ASR data associated with a second past spoken natural language input, the second historical ASR data being determined by the natural language processing system;
   processing the first historical ASR data and the second historical ASR data to determine that the first past spoken natural language input is semantically similar to the second past spoken natural language input;
   receiving first past system output data associated with the first past spoken natural language input;
   receiving second past system output data associated with the second past spoken natural language input;
   determining that the first past system output data is similar to the second past system output data; and
   configuring the component using the first historical ASR data, the second historical ASR data, the first past system output data and the second past system output data.

3. The computer-implemented method of claim 2, further comprising:
   receiving first historical context data associated with the first past spoken natural language input;
   receiving second historical context data associated with the second past spoken natural language input;
   processing the first historical context data and the second historical context data to determine that a portion of the first historical context data is similar to a portion of the second historical context data; and
   based on the portion of the first historical context data being similar to the portion of the second historical context data, configuring the component using the first historical ASR data, the second historical ASR data, the first past system output data, the second past system output data, the portion of the first historical context data, and the portion of the second historical context data.

4. The computer-implemented method of claim 1, further comprising:
   receiving, at the user device, second input audio data representing a second spoken natural language input;
   determining, by the user device, second ASR data representing a transcription of the second input audio data;
   determining, by the user device, second NLU data representing a meaning of the second ASR data, the second NLU data including a representation of a first domain;
   determining, by the component of the user device and using stored data, that the first domain corresponds to a second domain, included in the stored data, for which processing by the component is to be evaluated with respect to processing by the natural language processing system;
   based at least in part on determining that the first domain corresponds to the second domain, sending, to the natural language processing system, at least one of the second input audio data and the second ASR data;
   receiving, from the natural language processing system, third output data responsive to the second spoken natural language input; and
   causing, by the user device, presentation of the third output data in response to the second spoken natural language input.

5. A computer-implemented method comprising:
   receiving first input data corresponding to a first natural language input;
   processing, using a component, the first input data to determine first output data responsive to the first natural language input, wherein the component is configured using past user inputs and corresponding past system outputs that were determined by a natural language processing system that uses more computing resources than the component with respect to processing natural language inputs;
   processing, using the natural language processing system, the first input data to determine second output data responsive to the first natural language input;
   determining that the first output data is different than the second output data; and based at least in part on the first output data being different than the second output data, configuring the component using additional past user inputs and corresponding additional past system outputs, wherein the component is to be used to process future natural language inputs received by a user device that is remotely located from the natural language processing system.

6. The computer-implemented method of claim 5, further comprising:
processing, using the component, the first input data to determine a skill component to perform an action responsive to the first natural language input;
sending, to the skill component, the first input data; and
receiving, from the skill component, the first output data responsive to the first natural language input.

7. The computer-implemented method of claim 5, further comprising:
processing, using the component, the first input data to determine an action to be performed in response to the first natural language input;
determining a skill component capable of performing the action; and
sending, to the skill component, a command to perform the action.

8. The computer-implemented method of claim 5, further comprising:
processing second input data corresponding to a plurality of past natural language inputs received by the natural language processing system to determine a group of past natural language inputs that are similar;
processing third output data corresponding to a plurality of past system outputs to determine a group of past system outputs that are similar, the group of past system outputs including at least a first system output presented in response to at least a first past natural language input of the group of past natural language inputs; and
configuring the component using the second input data and the third output data.

9. The computer-implemented method of claim 8, further comprising:
processing context data corresponding to the plurality of past natural language inputs;
determining a first portion of the context data is similar to a second portion of the context data; and
configuring the component using the group of past natural language inputs, the group of past system outputs, the first portion, and the second portion.

10. The computer-implemented method of claim 5, further comprising:
determining a group of past natural language inputs received by the natural language processing system, the group of past natural language inputs including at least a first past natural language input and a second past natural language input that is similar to the first past natural language input;
determining a group of past system outputs determined by the natural language processing system, the group of past system outputs including at least a first past system output and a second past system output that is similar to the first past system output;
determining that the group of past system outputs is associated with the group of past natural language inputs; and
configuring the component using the group of past natural language inputs and the group of past system outputs.

11. A system comprising:
at least one processor; and
at least one memory including instructions that, when executed by the at least one processor, cause the system to:
receive first input data corresponding to a first natural language input;
process, using a component, the first input data to determine first output data responsive to the first natural language input, wherein the component is configured using past user inputs and corresponding past system outputs that were determined by a natural language processing system that uses more computing resources than the component with respect to processing natural language inputs, wherein the natural language processing system is remotely located from a plurality of user devices;
process, using the natural language processing system, the first input data to determine second output data responsive to the first natural language input;
determine that the first output data is different than the second output data; and
based at least in part on the first output data being different than the second output data, configure the component using additional past user inputs and corresponding additional past system outputs, wherein the component is to be used to process future natural language inputs received by the user device that is remotely located from the natural language processing system.

12. The system of claim 11, wherein the instructions, when executed by the at least one processor, further cause the system to:
process, using the component, the first input data to determine a skill component to perform an action responsive to the first natural language input;
send, to the skill component, the first input data; and
receive, from the skill component, the first output data responsive to the first natural language input.

13. The system of claim 11, wherein the instructions, when executed by the at least one processor, further cause the system to:
process, using the component, the first input data to determine an action to be performed in response to the first natural language input;
determine a skill component capable of performing the action; and
send, to the skill component, a command to perform the action.

14. The system of claim 11, wherein the instructions, when executed by the at least one processor, further cause the system to:
process second input data corresponding to a plurality of past natural language inputs received by the natural language processing system to determine a group of past natural language inputs that are similar;
process third output data corresponding to a plurality of past system outputs to determine a group of past system outputs that are similar, the group of past system outputs including at least a first system output presented in response to at least a first past natural language input of the group of past natural language inputs; and
configure the component using the second input data and the third output data.

15. The system of claim 14, wherein the instructions, when executed by the at least one processor, further cause the system to:

process context data corresponding to the plurality of past natural language inputs;

determine a first portion of the context data is similar to a second portion of the context data; and configure the component using the group of past natural language inputs, the group of past system outputs, the first portion, and the second portion.

16. The system of claim 11, wherein the instructions, when executed by the at least one processor, further cause the system to:

determine a group of past natural language inputs received by the natural language processing system, the group of past natural language inputs including at least a first past natural language input and a second past natural language input that is similar to the first past natural language input;

determine a group of past system outputs determined by the natural language processing system, the group of past system outputs including at least a first past system output and a second past system output that is similar to the first past system output;

determine that the group of past system outputs is associated with the group of past natural language inputs; and configure the component using the group of past natural language inputs and the group of past system outputs.

* * * * *